United States Patent [19]

Long

[11] Patent Number: 4,569,163
[45] Date of Patent: Feb. 11, 1986

[54] MODULAR UNIT ADAPTED FOR MEDICAL USE

[76] Inventor: Dennis L. Long, 2524 Santigo SE., Grand Rapids, Mich. 49506

[21] Appl. No.: 538,513

[22] Filed: Oct. 3, 1983

Related U.S. Application Data

[63] Continuation-in-part of Ser. No. 518,480, Jul. 29, 1983, Pat. No. 4,511,024.

[51] Int. Cl.⁴ .............................................. E04B 1/343
[52] U.S. Cl. ........................................... 52/36; 52/70; 52/143
[58] Field of Search ................ 52/36, 64, 70, 71, 79.5, 52/79.1, 143; 312/281, 224, 237, 228, 314, 258, 108; 280/301

[56] References Cited

U.S. PATENT DOCUMENTS

| | | |
|---|---|---|
| 786,670 | 4/1905 | Parker . |
| 1,133,866 | 3/1915 | Leighty . |
| 1,244,497 | 10/1917 | Hammock . |
| 1,408,731 | 3/1922 | Harris . |
| 2,185,513 | 1/1940 | Middleton . |
| 2,456,536 | 12/1948 | Doggett et al. . |
| 3,418,765 | 12/1968 | Propst et al. ............................ 52/36 |
| 3,540,788 | 11/1970 | Lundquist . |
| 3,748,010 | 7/1973 | Garte . |
| 4,074,475 | 2/1978 | Wahlquist ......................... 52/143 X |
| 4,087,144 | 5/1978 | Wax ..................................... 52/36 X |
| 4,103,463 | 8/1978 | Dixon ................................ 52/143 X |
| 4,221,441 | 9/1980 | Bain . |
| 4,290,659 | 9/1981 | Yoshiyuki . |
| 4,478,467 | 10/1984 | Tyndall .............................. 52/36 X |

FOREIGN PATENT DOCUMENTS 2113111 10/1972 Fed. Rep. of Germany .......... 52/36

Primary Examiner—J. Karl Bell
Attorney, Agent, or Firm—Ian C. McLeod

[57] ABSTRACT

A modular unit (11a, 11b, 11c, 11d) containing cabinets (14) adapted for medical use as described. The unit includes one or more foldable panels (25) and is portable. The unit includes access doors (30) for entry into the unit when the panels are folded and sliding doors 47 when the panels are unfolded.

13 Claims, 8 Drawing Figures

MODULAR UNIT ADAPTED FOR MEDICAL USE

CROSS REFERENCE TO RELATED APPLICATION

This application is a continuation-in-part of application Ser. No. 518,480, filed July 29, 1983 now U.S. Pat. No. 4,511,024.

BACKGROUND OF THE INVENTION (1) Field of the Invention

The present invention relates to modular units including at least one foldable panel on a central divider and which have a cabinet and a foldable bed or other work surface. The units provide work stations and can be joined to similar units to form a system. When the panels are folded the unit is portable for relocation.

(2) Prior Art And Related Inventions

The prior art is described in U.S. Pat. Nos. 786,670 to Parker; 1,133,866 to Leighty; 1,244,497 to Hammock; 1,408,731 to Harris; 2,185,513 to Middleton; 2,456,536 to Doggett et al; 3,540,788 to Lundquist; 3,748,010 to Garte; 4,221,441 to Bain and 4,290,659 to Yoshiyuki. Except for Garte, these patents describe units which are not designed to be modular so as to form a system of multiple units.

Garte describes in reference to FIG. 4 a cabinet structure with two folddown tables one on each of two separate cabinets positioned together in a modular fashion. The tables are used for patient examinations. Such modular units are useful, but provide no privacy which is essential in hospital and physical examination settings.

One problem with the prior art cabinet sructures is that they do not provide ease of loading when the cabinet doors are closed since the doors cover up drawers and the like. There are no modular units that are known to the inventor where access is provided to a cabinet when the unit is in a folded condition.

In my application Ser. No. 518,480, I described a portable modular unit and system having a central divider particularly including a conveyor as the central divider and with foldable panels formed of tubular members to provide open panels. In the present application, a modular unit and system is described which is particularly adapted for patient examinations where privacy is required and thus where solid foldable panels are provided.

OBJECTS

It is therefore an object of the present invenion to provide a modular unit which is adapted to form a system including several units and which has foldable panels which provide an enclosed work area providing privacy. It is further an object of the present invention to provide a modular unit which can be loaded with medical supplies or the like in its folded or closed condition. These and other objects will become increasingly apparent by reference to the following description and the drawings.

IN THE DRAWINGS

FIG. 1A shows a modular unit (11d) in a folded condition for movement to a new location and in particular shows a door (30) for access to the unit.

GENERAL DESCRIPTION

Figure 1:
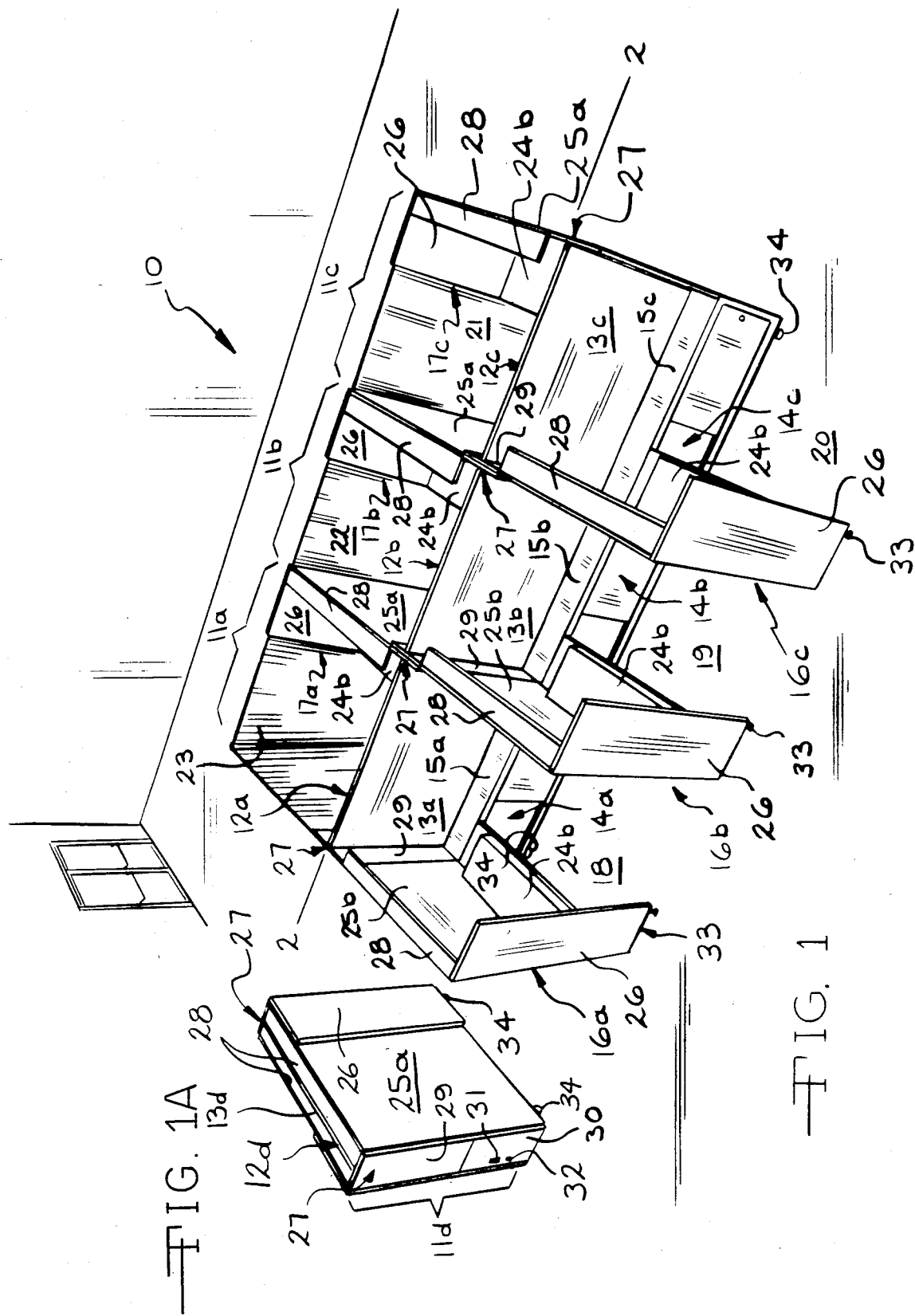
FIG. 1 is an isometric view of a room, such as a gymnasium, with three modular units (11a, 11b and 11c) in an unfolded condition joined together to form a system (10)

The present invention relates to a portable and unfoldable modular unit (11) to be joined to similar modular units for providing work stations (18, 19, 20, 21, 22 and 23) which comprises:

(a) a central divider (12) including a solid vertically oriented wall having opposite ends (27) and sides located between the ends and a top and a bottom, a cabinet structure (14) on at least one side of and adjacent to the bottom of the wall; and a horizontally oriented first work surface mounted on the cabinet at a level for use in a standing or a sitting position; and (b) a vertically oriented solid first panel (25) mounted on the central divider by hinge means (45) so as to be unfoldable on a vertical axis into an open position at a 90° angle away from a line (2—2) between the ends of the central divider to provide the work stations and so as to be foldable on the vertical axis parallel to the line between the ends.

The present invention particularly relates to a portable and unfoldable modular unit (11) for providing combined work stations (18, 19, 20, 21, 22, 23) which comprises:

(a) a central divider (12) including a solid vertically oriented wall (13) having opposite ends (27) and sides located between the ends and a top and a bottom, with a cabinet structure on each side of and adjacent to the bottom of the wall and with a horizontally oriented first surface mounted on the cabinets on each side of the wall at a level for use in a standing or sitting position;

(b) a vertically oriented first solid panel (25) mounted on the central divider by hinge means (45) so as to be unfoldable on a vertical axis into an open position at a 90° angle away from the wall and so as to be foldable on the vertical axis parallel to a line (2—2) between the ends of the wall;

(c) a vertically oriented second solid panel (26) mounted on the first panel by hinge means (46) so as to be in an open position at a 90° angle from the first panel and parallel to the line between the ends of the wall and so as to be foldable parallel to the line between the ends of the wall;

(d) a second work surface (24) hinged on the first panel and held in place by a first retaining means (40) such that when the work surface is folded the surface is parallel to the first panel and when in an open position is at about a 90° angle to the first panel; and (e) second retaining means (42) mounted on the second panel to hold the work surface in the open position, wherein when the work surface is folded the first and second panels can be folded to be positioned parallel with the line between the ends of the wall in order to provide the unit in a folded portable configuration.

SPECIFIC DESCRIPTION

FIG. 1 shows three (3) modular units 11a, 11b, 11c joined together to form a modular system 10. For reference purposes the lower case letters are used to designate identical elements on different units 11. Each unit 11a, 11b and 11c includes central dividers 12a, 12b and 12c including a wall 13a, 13b and 13c and cabinet structures 14a, 14b and 14c each supporting a fixed first work surface 15a, 15b, 15c. Each modular unit 11a, 11b and 11c includes a foldable section 16a, 16b and 16c on one side of the central dividers 12a, 12b and 12c and second foldable sections 17a, 17b and 17c on the opposite side of the central divider 12a, 12b and 12c. Each central divider 12 combined with foldable sections 16 and 17 provides a work station 18, 19, 20, 21, 22 and 23. Each foldable section 16 and 17 includes a second foldable work surface 24, which can be a bed for medical examination units, supported by first solid panels 25a and 25b and a second solid panel 26. The ends 27 of the central dividers 12a, 12b and 12c are joined together in series to form the modular system 10 in the embodiment shown in FIG. 1. The panels 25 are provided with covers 28 which can mount lights above the work surface 24 (not shown) and which provide closure of the unit 11a, 11b and 11c when folded as shown in FIG. 1A.

FIG. 1A shows a modular unit 11d in a folded configuration. The central divider 12d including the wall 13d is enclosed by the folded first panels 15a and folded second panel 26 which are parallel to the wall 13d. The covers 28 engage the wall 13d. At the ends 27 of the unit 11d are side closures 29 perpendicular to the wall 13d which are above hinged doors 30 leading into cabinets 14a, 14b and 14c with handle 31 for opening and a lock 32 to secure the cabinet 14a, 14b or 14c from unauthorized entry. As can be seen, the unit 11d can be loaded when the panels 25 and 26 are in a folded position. The units 11a, 11b and 11c preferably include levelers 33 and lockable rollers or casters 34.

Figure 2:
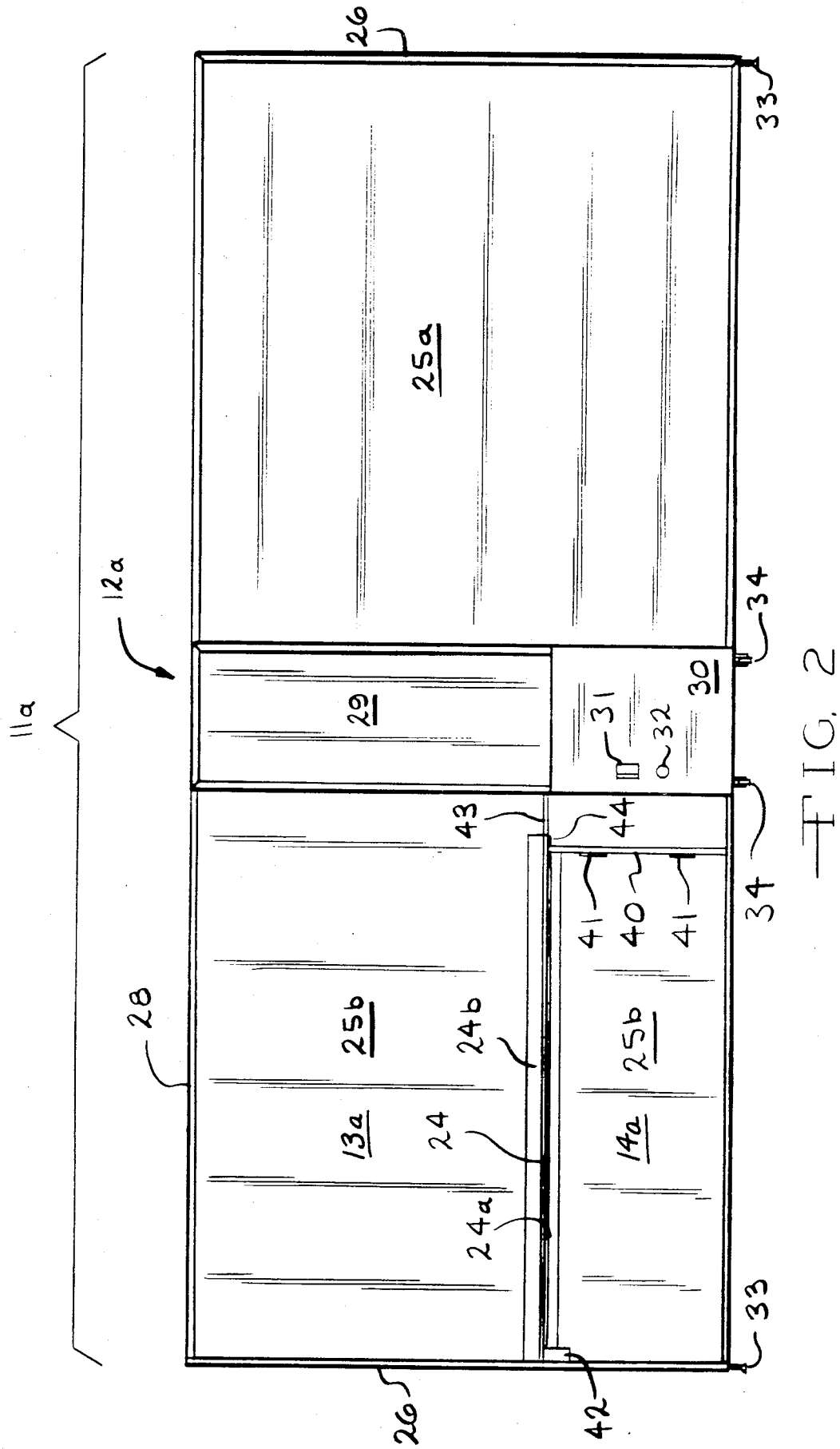
FIG. 2 is an end view of a modular unit (11a) with two unfolded panels (25a and 25b) on each side of a wall (13a) and cabinet structure (14a) which forms a central divider (12a) and particularly illustrating the door (30) in the cabinet structure which is accessible whether or not the panels are folded or unfolded.
Figure 3:
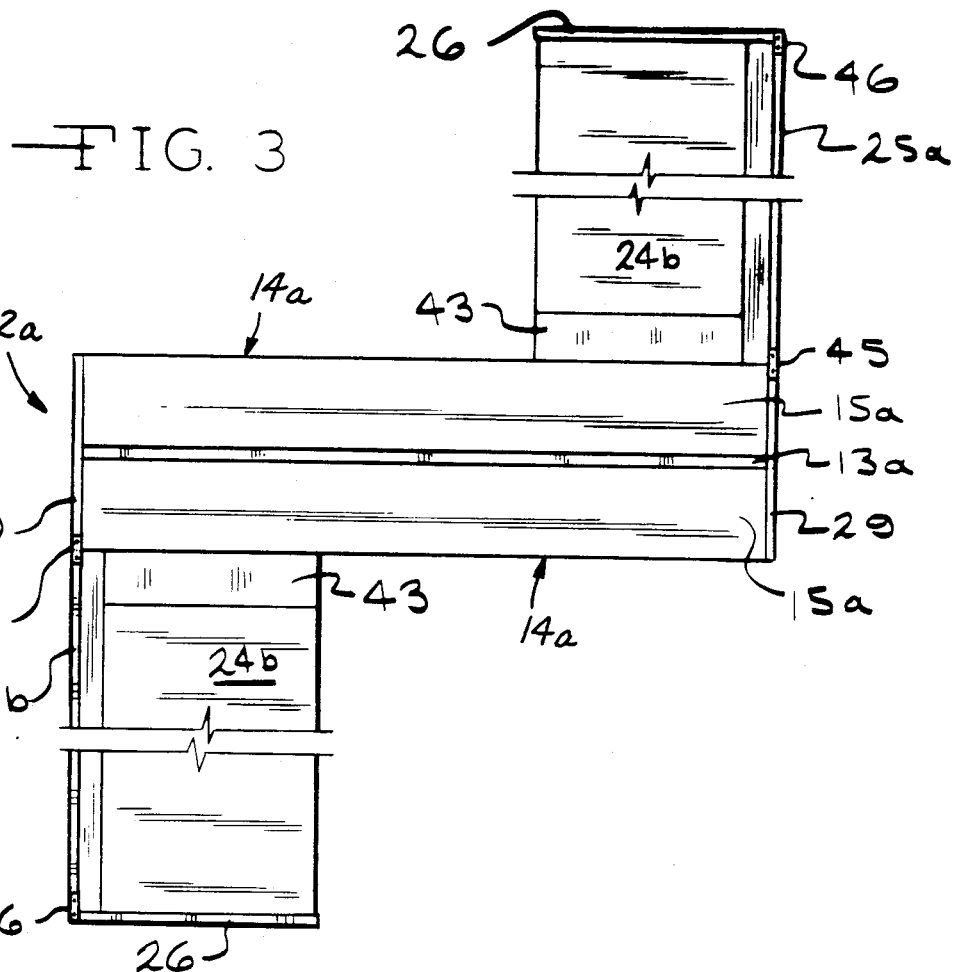
FIG. 3 is a plan view of the modular unit (11a) of FIG. 2 in the unfolded position particularly illustrating the panels (25a and 25b) on each side of the cabinet structure (14a) on the central divider (12a) each of which have a foldable work surface or bed (24b).
Figure 4:
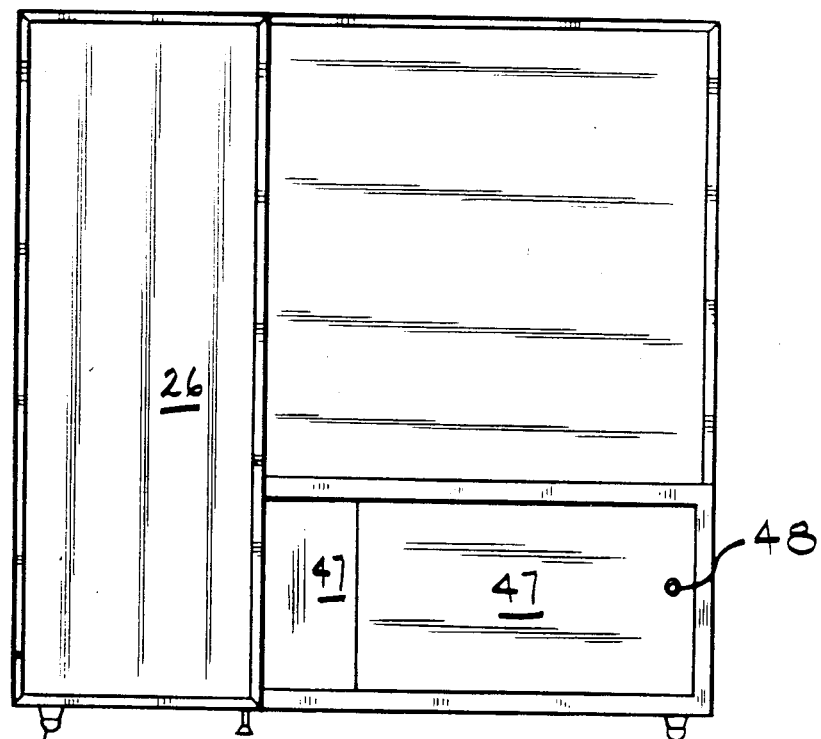
FIG. 4 is a side view of the unfolded modular of unit of FIG. 2 particularly illustrating the cabinet structure (14a) on the central divider.

FIGS. 2 to 4 show the unfolded modular unit 11a in more detail. As shown the second work surface 24 is supported by a piano type hinge 24a and supported by a bracket or first retaining means 40 with hinges 41 so that it folds to allow the surface 24 to fold up and secured by a latch mechanism (not shown). The pull 24b can be removed. The second work surface 24 is mounted on a block or second retaining means such as block 42 provided on the second panel 26. The retaining means can be a sliding pin (not shown) which engages panel 26 (not shown). The foldable work surface 24 has an optional extension 43 with hinges 44 which provides continuity with the first work surface 15a. As shown the side closures 29 are provided with hinges 45 which mount the first panels 25a and 25b. The second panels 26 are mounted to the first panel by means of hinges 46. As shown in FIG. 4, the cabinet 14c includes sliding door 47 for access using finger recess 48.

Figure 5:
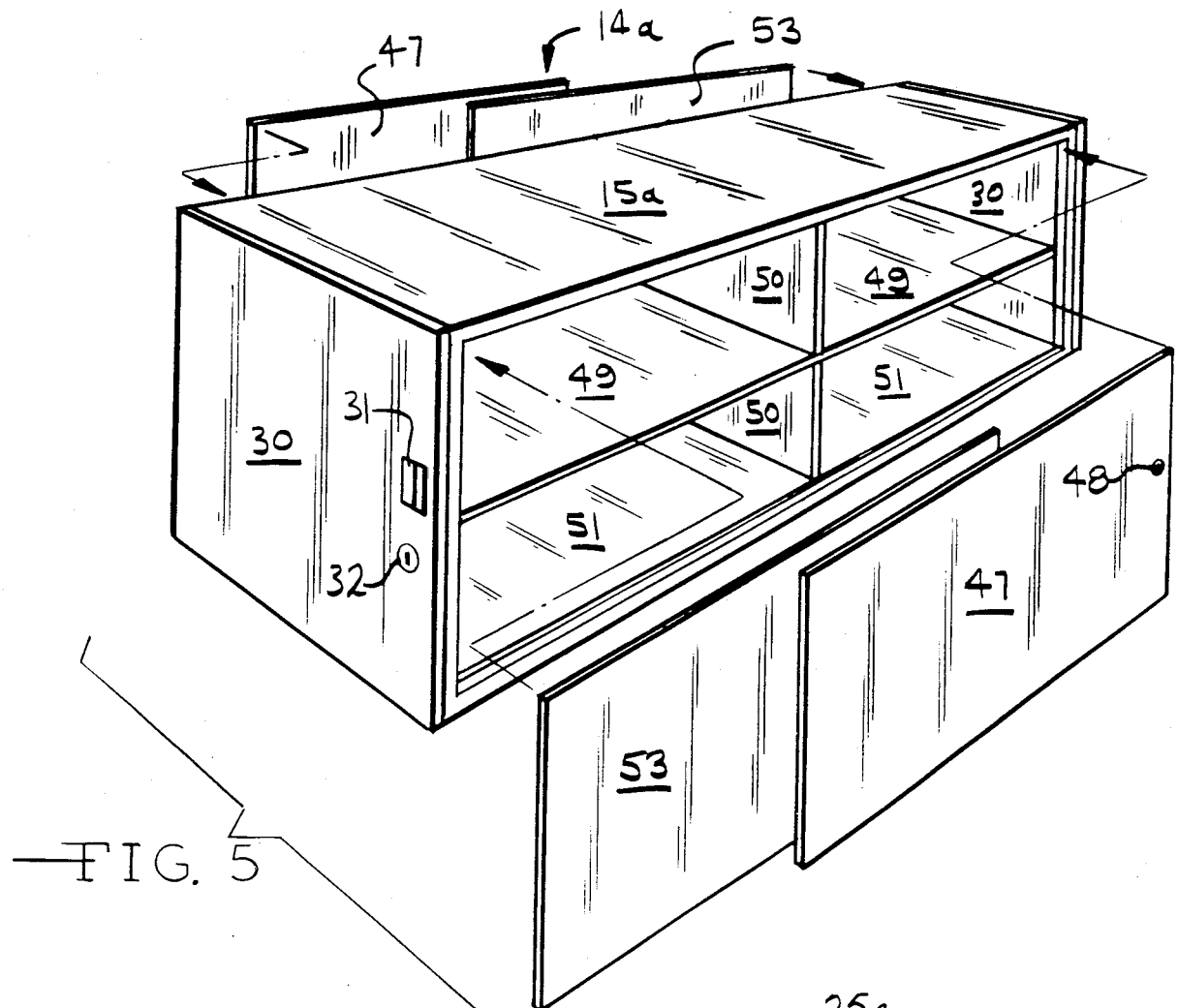
FIG. 5 is an isometric view of the cabinet structure (14a), particularly illustrating hinged doors (30) which provide security for two sections and wherein each of the two sections is loaded through the ends of the cainet structure by opening the doors (30).

FIG. 5 shows the detailed construction of the cabinet 14a, including an interior panel 50 which divides the cabinet in half. Upper shelves 49 and lower shelves 51 provide surfaces for articles to be placed in the cabinet 14 by opening hinged doors 30. Sliding doors 47 provide access to the respective cabinet sections on each side of interior panel 50 when the cabinet 14a is open. The sides 53 are fixed so that access to the section behind the side 53 is prevented.

Figure 6:
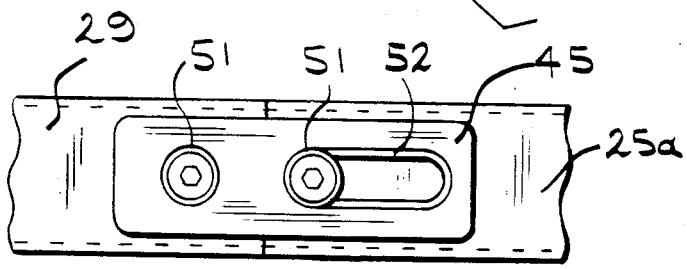
FIGS. 6, 7 and 8 are front and plan views of panel (25a or 25b) joined to side closures (29) on the wall (13a) of the central divider (12a) by means of slideable and locking hinges (45 and 46) which are identical in construction.
Figure 7:
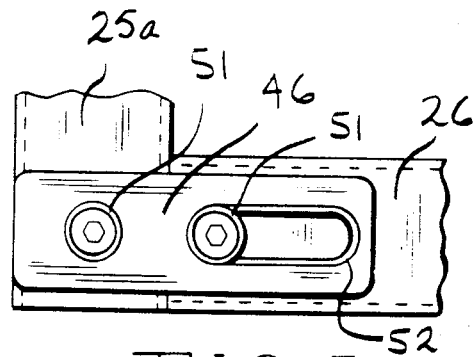
Figure 8:
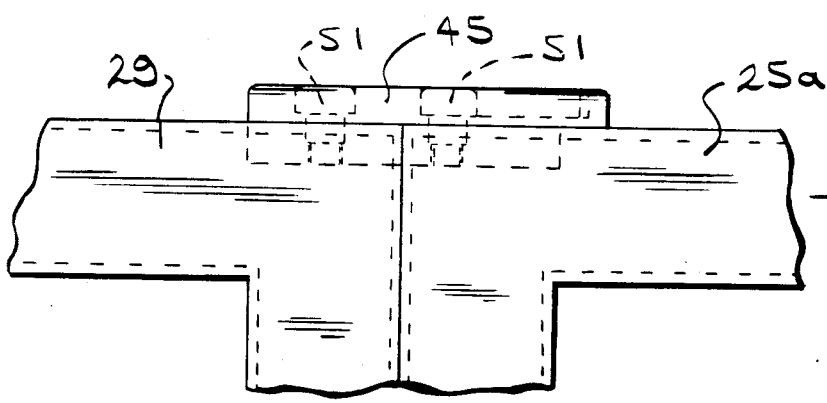

FIGS. 6, 7 and 8 show the details of hinges 45 and 46. As can be seen threaded bolts 51 thread into panels 25a and 29 or 26 and 25a. The hinges 45 and 46 have a slot 52 so that the panels 25a, 26 and 29 can be folded and unfolded. The hinges are provided on the tops of the panels 25a, 26 and 29 and on the bottoms (not shown). The bolts 51 are preferably loosened and tightened with conventional hexhead screwdrivers.

In use the cabinets 14 are loaded with medical supplies while the units 11 are in a folded condition. The hinged doors 30 are then closed and locked with lock 32. The panels 25 and 26 can also be locked in the closed position. In use in a gymnasium or the like, the panels 25 and 26 are opened and the surface 24 is folded down. A curtain (not shown) can be provided between panels 26 to provide privacy.

As can be seen the modular unit of the present invention is a significant improvement over the prior art units. The modular units provide considerable ease in opening and folding which is an advantage, particularly in emergency situations.

I claim:

1. A portable and foldable modular unit to be joined to similar modular units for providing work stations which comprises:
   (a) a central divider including a solid vertically oriented wall having opposite ends and sides located between the ends and a top and a bottom, a cabinet structure on at least one side of and adjacent the bottom of the wall, side closures mounted at the ends perpendicular to the wall and with a horizontally oriented first work surface mounted on the cabinet between the side closures at a level for use in a standing or a sitting position; and
   (b) a vertically oriented solid first panel mounted on the side closures by hinge means so as to be unfoldable on a vertical axis into an open position at a 90° angle away from a line between the ends of the central divider to provide the work stations and so as to be foldable on the vertical axis parallel to the line between the ends to a closed position between the side closures and adjacent the work surface, wherein the hinge means allows the panel to be moved parallel to the vertical axis away from the side closure for repositioning of the panels so that the panel abuts against the side closure when folded in the open position so as to be continuous with the side closure and so as to provide a square corner with the side closure in the closed position wherein the panel and central divider have a height and a length so as to define a partially enclosed working enclosure.

2. The modular unit of claim 1 including a vertically oriented second panel mounted on the first panel by hinge means so as to be in an open position at a 90° angle to the first panel and parallel to the line between the ends of the central divider on the vertical axis wherein the first and second panel members can be folded to be positioned parallel with the line between the ends of the central divider in order to provide the unit in a portable configuration.

3. The modular unit of claim 1 wherein two panels are provided one on each side of the central divider at opposite ends on each of the side closures.

4. The modular unit of claim 1 including lockable rollers mounted on the central divider for movement of the unit in the folded configuration when the casters are unlocked and for preventing movement of the unit in the open position when the rollers are locked.

5. The modular unit of claim 1 linked with at least one additional modular unit to provide the work stations.

6. The modular unit of claim 1 wherein a second work surface is hingedly mounted on the solid first panel so as to be foldable upwards when the panel is folded in the closed position.

7. A portable and foldable modular unit for providing work stations, which comprises:
   (a) a central divider including a solid vertically oriented wall having opposite ends and sides located between the ends and a top and a bottom, with a cabinet on each side of and adjacent to the bottom of the wall side closures mounted at the ends perpendicular to the wall and with a horizontally oriented first surface mounted on the cabinets on each side of the wall between the side closures at a level for use in a standing or sitting position;
   (b) a vertically oriented first solid panel mounted on the side closures by first hinge means so as to be unfoldable on a vertical axis into an open position at a 90° angle away from the wall and so as to be foldable on the vertical axis parallel to a line (2—2) between the ends of the wall to a closed position between the side closures and adjacent the work surface;
   (c) a vertically oriented second solid panel mounted on the first panel by second hinge means so as to be in an open position at a 90° angle from the first panel and parallel to the line between the ends of the wall and so as to be foldable parallel to the line between the ends of the wall to a closed position between the closures and adjacent to the first panel, wherein the first and second hinge means allow the panels to be moved parallel to the vertical axis away from the side closure for repositioning so that the panels abut against the side closures when folded in the open position to be continuous with the side closure and so as to provide a squared corner with the side closure when in the closed position wherein the panels and central divider have a height and a length so as to define a partially enclosed working enclosure;
   (d) a work second surface hinged on the first panel and held in place by a first retaining means such that when the work surface is folded the surface is parallel to the first panel and when in an open position is at about a 90° angle to the first panel; and
   (e) second retaining means mounted on the second panel to hold the work surface in the open position, wherein when the work surface is folded the first and second panels can be folded to be positioned parallel with the line between the ends of the wall in order to provide the unit in a folded portable configuration.

8. The modular unit of claim 7 wherein the central divider is mounted on rollers to provide for rolling movement of the modular unit in the folded portable configuration.

9. The modular unit of claim 8 wherein the casters are lockable to prevent rolling when the panels and work surface are in an open position and wherein the panels have height adjustable floor supports for holding the panels in the open position.

10. The modular unit of claim 7 wherein the second work surface connects to the second panel by means of blocks and to a foldable bracket on the first panel to hold the second work surface in an open position.

11. The modular unit of claim 7 wherein each modular unit includes two sets of folding first and second panels each with the second work surface and wherein one set is mounted at each end of and on opposite sides of the central divider.

12. The modular unit of claim 7 linked with at least one additional modular unit.

13. The modular unit of claim 7 wherein the cabinet structure has access doors at opposite ends of the unit for entry into the cabinet structure while the panels are in a closed position.

* * * * *